US012420191B2

(12) United States Patent
Williams et al.

(10) Patent No.: US 12,420,191 B2
(45) Date of Patent: Sep. 23, 2025

(54) AUTOMATED GROUPING SYSTEM AND METHOD FOR A MERGE AND MATCH GAME MECHANIC

(71) Applicant: Aristocrat Technologies, Inc., Las Vegas, NV (US)

(72) Inventors: Zoe Williams, Warwickshire (GB); Colin Drake, Bend, OR (US); Michael Ostashewski, Vancouver (CA); Dave Smith, Burnaby (CA); Suguru Motegi, Vancouver (CA)

(73) Assignee: Aristocrat Technologies, Inc., Las Vegas, NV (US)

( * ) Notice: Subject to any disclaimer, the term of this patent is extended or adjusted under 35 U.S.C. 154(b) by 268 days.

(21) Appl. No.: 18/337,386

(22) Filed: Jun. 19, 2023

(65) Prior Publication Data

US 2024/0278125 A1 Aug. 22, 2024

Related U.S. Application Data

(60) Provisional application No. 63/486,428, filed on Feb. 22, 2023.

(51) Int. Cl.
*A63F 13/5372* (2014.01)
*A63F 13/533* (2014.01)
*A63F 13/69* (2014.01)
*A63F 13/77* (2014.01)

(52) U.S. Cl.
CPC .......... *A63F 13/5372* (2014.09); *A63F 13/69* (2014.09); *A63F 13/77* (2014.09); *A63F 13/533* (2014.09)

(58) Field of Classification Search
None
See application file for complete search history.

(56) References Cited

U.S. PATENT DOCUMENTS

| 2012/0209839 | A1* | 8/2012 | Andrews | H04W 4/029 707/E17.014 |
|---|---|---|---|---|
| 2014/0171166 | A1* | 6/2014 | Merari | A63F 13/55 463/9 |
| 2017/0239571 | A1* | 8/2017 | Hazama | A63F 13/53 |
| 2017/0296932 | A1* | 10/2017 | Kushner | A63F 13/332 |
| 2018/0093188 | A1* | 4/2018 | Mabuchi | A63F 13/60 |
| 2022/0088483 | A1* | 3/2022 | Dicken | A63F 13/35 |
| 2022/0398893 | A1* | 12/2022 | Wang | G07F 17/326 |
| 2024/0293749 | A1* | 9/2024 | Kim | A63F 13/42 |
| 2024/0375001 | A1* | 11/2024 | Matsumoto | A63F 13/533 |

* cited by examiner

*Primary Examiner* — Dorothy Harris
(74) *Attorney, Agent, or Firm* — Armstrong Teasdale LLP

(57) ABSTRACT

A gaming system is provided. The gaming system may be configured to (1) store, in a memory, an initial location of a plurality of game items within a plurality of game board tiles; (2) cause the user device to display a user interface including the plurality of game board tiles and the plurality of game items; (3) receive, from the user device, a selection of a target game item using an automated grouping tool; (4) identify a group of game items having a same item type as the target game item; (5) identify a plurality of target game tiles located adjacent to the target game item; (6) record, in the memory, an updated location for each of the identified group of game items; and (7) cause the user device to display the user interface to include the identified group of game items located in the updated locations.

20 Claims, 19 Drawing Sheets

AUTOMATED GROUPING SYSTEM AND METHOD FOR A MERGE AND MATCH GAME MECHANIC

CROSS-REFERENCE TO RELATED APPLICATIONS

This application claims the benefit of priority to U.S. Provisional Application Ser. No. 63/486,428, filed Feb. 22, 2023, and entitled "AUTOMATED GROUPING SYSTEM AND METHOD FOR A MERGE AND MATCH GAME MECHANIC," the contents and disclosures of which are hereby incorporated in their entirety.

TECHNICAL FIELD

The field of disclosure relates generally to electronic gaming, and more particularly, to an automated grouping system and method for a merge and match game mechanic.

BACKGROUND

With the growing popularity of casual gaming, consumers are able to play various types of games utilizing different mediums, including computing devices, tablet devices, mobile telephones, etc. Examples of casual games include puzzle games, hidden object games, word and trivia games, card games, board games, and Mahjong games. In some games, game players typically attempt to achieve an objective via a game board, which is filled automatically as the game player progresses through the game board. Many of these games are based on luck, as opposed to a strategy employed by the game player.

BRIEF DESCRIPTION

In one aspect, a gaming system is provided. The gaming system may include a memory and one or more processors in communication with the memory. The one or more processors may be configured to generate a user interface including a plurality of game board tiles. The one or more processors may be further configured to store, in the memory, an initial location of a plurality of game items, each of the game items having a type of a plurality of types and located in one of the game board tiles. The one or more processors may be further configured to transmit game data to a user device causing the user device to display the user interface including the plurality of game board tiles and plurality of game items. The one or more processors may be further configured to receive, from the user device, a selection of a target game item of the plurality of game items using an automated grouping tool. The one or more processors may be further configured to identify a group of game items having a same type as the target game item. The one or more processors may be further configured to identify a plurality of target game tiles located adjacent to the target game item. The one or more processors may be further configured to update, in the memory, the locations of the identified group of game items to the identified target game tiles. The one or more processors may be further configured to transmit further game data to the user device causing the user device to display the game display having the updated locations. The one or more processors may be further configured to clear, in the memory, the initial locations of the plurality of game items. The one or more processors may be further configured to disable subsequent use of the automated grouping tool for a predefined cooldown period.

In another aspect, a gaming system is provided. The gaming system may include a memory and one or more processors in communication with the memory. The one or more processors may be configured to store, in the memory, an initial location of a plurality of game items within a plurality of game board tiles. Each of the game items may have an item type of a plurality of item types and may be located in one of the game board tiles. The one or more processors may be further configured to transmit game data to a user device causing the user device to display a user interface including the plurality of game board tiles and the plurality of game items. The one or more processors may be further configured to receive, from the user device, a selection of a target game item of the plurality of game items using an automated grouping tool. The one or more processors may be further configured to identify a group of game items having a same item type as the target game item. The one or more processors may be further configured to identify a plurality of target game tiles located adjacent to the target game item. The one or more processors may be further configured to record, in the memory, an updated location for each of the identified group of game items. The updated locations may correspond to the identified plurality of target game tiles. The one or more processors may be further configured to transmit further game data to the user device causing the user device to display the user interface to include the identified group of game items located in the updated locations.

In another aspect, a method for automated grouping in an electronic game may be provided. The method may be performed by a gaming system including a memory and one or more processors in communication with the memory. The method may include storing, in the memory, an initial location of a plurality of game items within a plurality of game board tiles. Each of the game items may have an item type of a plurality of item types and may be located in one of the game board tiles. The method may further include causing a user device to display a user interface including the plurality of game board tiles and the plurality of game items. The method may further include receiving, from the user device, a selection of a target game item of the plurality of game items using an automated grouping tool. The method may further include identifying a group of game items having a same item type as the target game item. The method may further include identifying a plurality of target game tiles located adjacent to the target game item. The method may further include recording, in the memory, an updated location for each of the identified group of game items. The updated locations may correspond to the identified plurality of target game tiles. The method may further include causing the user device to update the user interface to include the identified group of game items located in the updated locations.

In another aspect, a non-transitory computer-readable storage media having computer-executable instructions embodied thereon is provided. When executed by a gaming system including at least one memory and one or more processors in communication with the memory, the computer-executable instructions may cause the one or more processors to store, in the at least one memory, an initial location of a plurality of game items within a plurality of game board tiles. Each of the game items may having an item type of a plurality of item types and may be located in one of the game board tiles. The computer-executable instructions may further cause the one or more processors to transmit game data to a user device causing the user device to display the plurality of game board tiles and the plurality of game items. The computer-executable instructions may further cause the one or more processors to receive, from the user device, a selection of a target game item of the plurality of game items using an automated grouping tool. The computer-executable instructions may further cause the one or more processors to identify a group of game items having a same item type as the target game item. The computer-executable instructions may further cause the one or more processors to identify a plurality of target game tiles located adjacent to the target game item. The computer-executable instructions may further cause the one or more processors to record, in the at least one memory, an updated location for each of the identified group of game items. The updated locations may correspond to the identified plurality of target game tiles. The computer-executable instructions may further cause the one or more processors to transmit further game data to the user device causing the user device to display the identified group of game items located in the updated locations.

DETAILED DESCRIPTION

Figure 1:
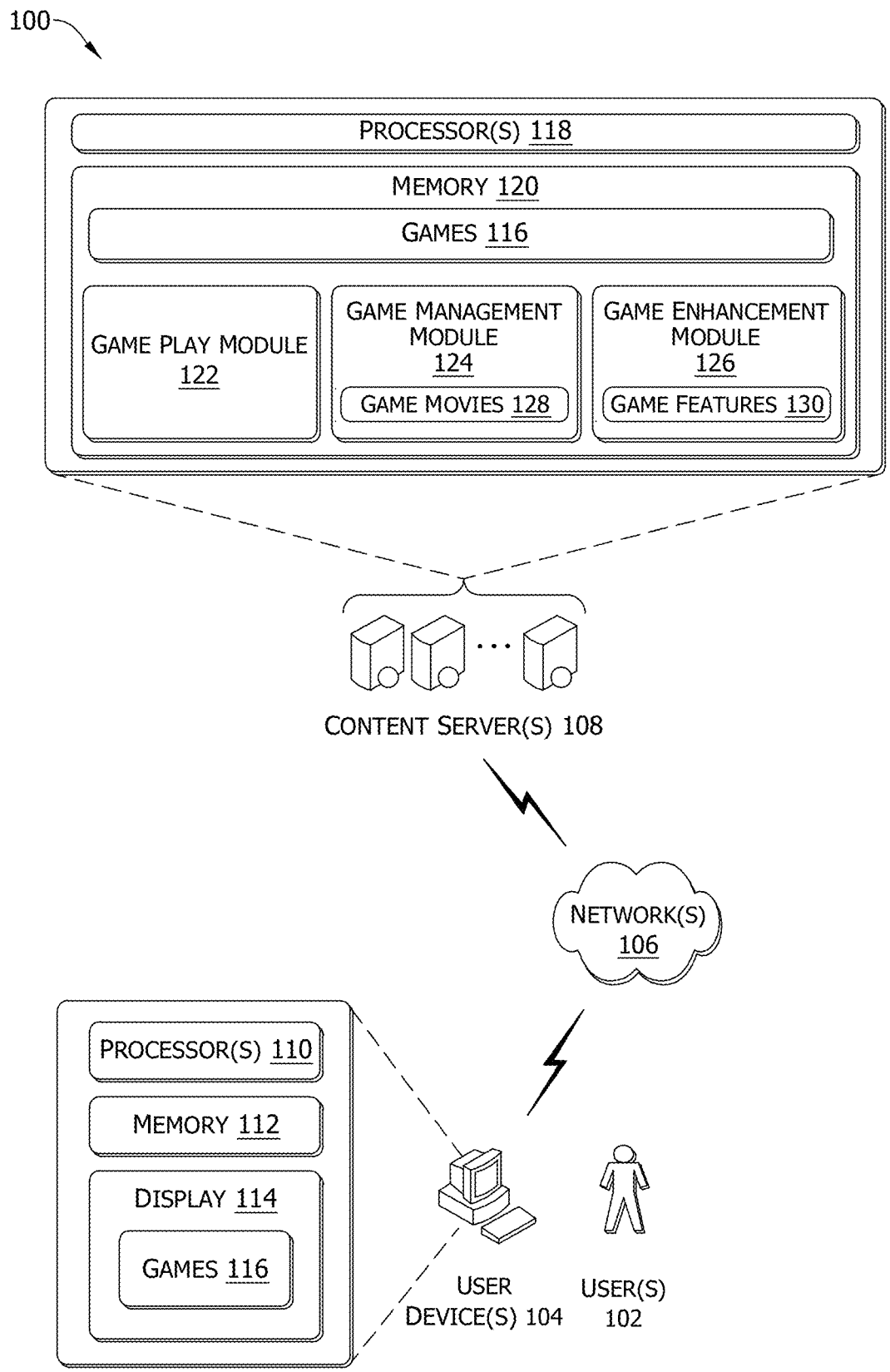
FIG. 1 is a diagram showing an example gaming system including one or more users, one or more user devices, one or more networks, and one or more content servers.

The systems and methods described herein include a gaming device including an improved user interface that allows for users to quickly gather and position the same game item types in adjacent game tiles with a single game command. In a merge and match game mechanic, a user typically needs to find, move, and rearrange game items such that the same game item types are next to each other for a given game board. After matching a certain number of game items in a given game board, the player is then able to perform a merge operation that merges the adjacent game to generate one or more new (e.g., upgraded) game items. To reduce the number of actions a user needs to move and rearrange game items to perform a merge operation, the improved user interface provides a variety of icons (sometimes referred to herein as "merge magnet" icons or "magnet symbols") that trigger an automated grouping tool automating the matching and moving of a target game item into adjacent tiles with a single action command.

In example embodiments, a game display user interface may include a plurality of game board tiles, each of which may contain one game item. The game items may be of one or more different item types, represented by different symbols (e.g., a log or a coin). The gaming system may store, in a memory, an initial location of a plurality of game items within the plurality of game board tiles, and may transmit data (sometimes referred to herein as "game data") to a user device that causes the user device to display the user interface including the plurality of game board tiles and the plurality of game items, with the game items being located within respective game board tiles as specified by the initial locations stored in the memory.

When the user inputs a command to use the automated grouping tool, the user may select a target game item. The gaming system may receive this selection of the target game item and may identify a group of game items having a same type as the target game item. For example, if the target item is a coin, the gaming system may identify other game items that are coins. The group may include a fixed number of other game items (e.g., the closest three game items) or may include all the game items of the same type currently displayed on the game board. The gaming system may further identify a plurality of target game tiles located adjacent to the target game item to which the other identified game items may automatically be moved.

To complete the automatic moving of the identified game items, the gaming system may record, in the memory, an updated location for each of the identified group of game items. The updated locations correspond to the identified target game tiles that located adjacent to the target game item. The system may then transmit further game data to the user device causing the user device to display the user interface to include the identified group of game items located in the updated locations.

At least one technical problem solved by the current disclosure relates to the user interface of a merge and match game mechanic. Generally in a merge and match game mechanic, the number of game board tiles is restricted to a limited number, and only one game item may be displayed within each game board tile. To make progress, players must collect and organize a wide variety of game items to make merges (e.g., by dragging game items to adjacent game board tiles). Given the vast array of game items available, game boards may often become messy and take a long time to organize. Specifically, the user may need to provide numerous game commands to move and match the same game items in adjacent game tiles. Further, given that the game board may have a limited number of available tiles to which a game item may be moved, a user may need to make several move operations in order to move a game item to a desired location. Thus, a user could experience a significant amount of frustration to perform merge operations when the game board has become disorderly and/or nearly entirely filled with game items. To reduce the number of actions a user needs to move and rearrange game items to perform a merge operation, the improved user interface provides an automated grouping tool, which may include a variety of "magnet" icons that automate the matching and moving of a target game item into adjacent tiles with a single action command. The automated grouping tool enables one or more game items to be moved with a single command to a desired location and/or locations (e.g., to form matching groups of adjacent game items to merge), even in situations where many move commands would typically be necessary in order to move the one or more game items to the desired location and/or locations. Further, in cases in which the desired locations are already occupied by other game items, the automated grouping tool may determine where to relocate the other game items (e.g., based on a predefined algorithm) in order to make room for the incoming matched items.

Another technical problem solved by the current disclosure relates to computer memory usage. A current "state" of the game (e.g., the current location of each game item displayed within the game board) may be recorded in the memory for each turn (e.g., each time one or more game items are moved by the user). As game items are moved and/or merged, the records corresponding to game items that are removed from the game board are not completely removed from memory, and the memory may retain data corresponding to previous states prior to the execution of a gaming command (e.g., moving and/or merging the game items). For example, the memory may store, at each state, a location of each game item within the game board. When the game progresses to a new state (e.g., as a result of an automated grouping or the user manually moving a game item), at least some of locations of the game items stored in the memory of the previous state may persist. Accordingly, when using functionality that automates the moving and/or merging of game items, the vast amount of moving and merging operations may result in memory overflow because of the accumulation of the amount data stored for prior states. To solve this technical issue, for a certain number of automated moving and/or merge operations, at least some of the memory, such as a cache, is cleared periodically to avoid consuming an excessive amount of memory. For example, the cache may be cleared after each automated move operation, after a set number of automated move operations occur, or after a certain time period passes.

The systems and methods described herein provide one or more of the following technical benefits: (1) an improved user interface for an electronic game including a merge and match game mechanic by executing an automated grouping tool that identifies, in a memory, locations of game items matching a selected target item and updating the locations of the game items in the memory; (2) an ability for a gaming system, which executing an automated grouping tool for a merge and match game mechanic, to make room within a user interface having a limited number of game tiles to move matching items to game tiles that are adjacent to a target item by executing an algorithm for relocating other items to other game tiles within the user interface; and/or (3) reducing usage of memory resources when executing an automated grouping tool in an electronic game having a merge and match game mechanic by periodically clearing a cache in the memory associated with previous locations of game items in response to using the automated grouping tool.

FIG. 1 illustrates an example gaming system 100 in which a user 102 may electronically or physically access games 116 (e.g., software games, casual games, physical games, games played for real or virtual currency, games of chance, etc.) and play those games 116, such as via a user device 104. As described below, the user device 104 may be implemented in any number of ways, such as a computer, a laptop computer, a tablet device, a personal digital assistant (PDA), a multi-functioning communication device, and so on. The user 102 may access the games 116 over a network 106, such as the Internet, which may be communicatively coupled to one or more content server(s) 108. The content server(s) 108 may store various types of games 116, such as software games, and other content that is accessible by the user device 104 (e.g., media content, audio content, video content, etc.). For instance, the user 102 may access and/or play the games 116 via one or more sites (e.g., a website) that are accessible via the network(s) 106 and/or via an application associated with the user device 104. One or more processor(s) 110, a memory 112, and a display 114 of the user device 104 may enable the user 102 to access and/or play the games 116. In addition to the games 116 being stored on, and/or accessed via, the content server(s) 108, the games 116 may also be stored directly on the user device 104.

Furthermore, one or more processor(s) 118 and a memory 120 of the content server(s) 108 may allow the content server(s) 108 to enable the users 102 to play the games 116. More particularly, a game play module 122, a game management module 124, and a game enhancement module 126 are stored in memory 120 and executed by the processor(s) 118 to facilitate playing the game(s) 116 by user 102. For example, game play module 122, game management module 124, and/or game enhancement module 126 may facilitate a merge and match game mechanic by tracking and storing a location of different types of game items within a game board of game board tiles, generating game data to transmit to user device 104 to display the merge and match game mechanic, and apply features such as the automated grouping function described in further detail below.

For the purposes of this discussion, the games 116 may include physical games 116 and games 116 that may be played online or via a user device 104. Moreover, the games 116 may be played for real currency (e.g., U.S. dollars) or virtual currency (e.g., chips, tokens, etc.). The games 116 may also relate to games of chance or casual gaming, which may include physical games, online games that may be played over the network(s) 106, and/or software games that may be stored on, and/or be accessible by, the user device 104.

Games of chance may refer to games in which the outcome is at least partly random or is influenced at least in part by a randomizing device. In games of chance, the players may elect to wager real or virtual currency, or anything of monetary value, prior to at least a portion of the game being played (e.g., spinning a set of reels). Examples of games of chance may include physical games, games played via a network 106, or games played via a user device 104, such as dice games, spinning tops, playing cards, slot machines, roulette wheels, and many other casino games. A game of chance may have some skill element, although the chance or randomness of the game may play a greater role in determining the outcome of the game. In other games of chance, a certain degree of skill may enhance a player's performance with respect to the game. This may be the case where the player(s) make game decisions based upon previous or incomplete knowledge, such as in various casino or card games (e.g., blackjack, poker, etc.).

Casual games may include games (e.g., video games) that are associated with any type of gameplay and any type of genre. Casual games may have a set of simple rules that allow a large audience to play, such games that may be played utilizing a touch-sensitive display, a telephone keypad, a mouse having one or two buttons, etc. Moreover, casual games may not require a long-term commitment or unique skills to play the game, thus allowing users 102 to play the game in short time increments, to quickly reach a final stage of the game, and/or to continuously play the game without needing to save the game. Casual games may also be played on any medium, including personal computers, game consoles, mobile devices, etc., and may be played online via a web browser. Casual games may be referred to as "casual" since the games may be directed towards consumers who can come across the game and get into gameplay in a short amount of time, if not immediately. Examples of casual games may include puzzle games, hidden object games, adventure games, strategy games, arcade and action games, word and trivia games, casino games, and/or card and board games.

Other games 116 may first be downloaded to and/or installed on the user device 104 and/or an application associated with the user device 104. These games 116, and the physical games, the games of chance (including physical and virtual games), and the casual games 116 described above, may also be acquired by the user 102. Regardless of whether the games 116 are stored on the user device 104 or the content server(s) 108, playing the games 116 may include accessing, viewing, trying, and/or otherwise interacting with the games 116.

The users 102 may access the games 116 in any of a number of different manners. For instance, the users 102 may play the games 116 in a physical setting (e.g., physical slot machines, card games, etc.). The users 102 may also access a site (e.g., a website) associated with an entity, such as a merchant, that provides access to the games 116. Such a site may be remote from the user device 104 but may allow the users 102 to interact with the games 116 via the network(s) 106. Moreover, the users 102 may download one or more applications to the user device 104 in order to access the games 116. In this case, the content server(s) 108 may provide, transmit, suggest, and/or recommend the games 116 to the user device 104, whereby the users 102 may interact with the games 116 via the downloaded application(s). In other embodiments, the games 116 may be streamed from the content server(s) 108 to the user device 104 such that the users 102 may interact with the games 116 in real-time. Once the user 102 accesses the games 116, the users 102 may perform a variety of actions, including learning about the games 116, viewing the games 116, trying the games 116, acquiring (e.g., purchasing, renting, leasing, etc.) the games 116, downloading/installing the games 116 to the user device 104, and/or playing the games 116.

Additionally, the users 102 may have a user account associated with the entity that provides and/or provides access to the games 116. For instance, assuming that the games 116 are available via a website, each of the users 102 may have a user account that specifies various types of information relating to the users 102. This information may include personal information, user preferences, and/or some user identifier (ID), which may be some combination of characters (e.g., name, number, etc.) that uniquely identifies the user 102 from other users 102.

In some embodiments, the user device 104 may be any type of device that is capable of receiving, accessing, playing, and/or otherwise interacting with the games 116, such as, for example, a personal computer, a laptop computer, a cellular telephone, a personal digital assistant (PDA), a tablet device, an electronic book (e-Book) reader device, a television, or any other device that may be used to access games 116 that may be viewed, tried, played, downloaded, installed, and/or acquired by the user 102. For instance, the user 102 may utilize the user device 104 to access and navigate between one or more sites, such as web sites, web pages related thereto, and/or documents or content associated with those websites or web pages that may be of interest to the user 102. For instance, the user 102 may utilize the user device 104 to access sites to view, play, and/or download the games 116. Further, the user device 104 shown in FIG. 1 is only one example of a user device 104 and is not intended to suggest any limitation as to the scope of use or functionality of any user device 104 utilized to perform the processes and/or procedures described herein. Although the games 116 may be played via the user device 104, certain games 116 may be played without the use of a user device 104. For example, various physical games and/or games of chance (e.g., slot machines, table top games, etc.) may be played in a physical setting without use of such user devices 104.

The processor(s) 110 of the user device 104 may execute one or more modules and/or processes to cause the user device 104 to perform a variety of functions, as set forth above and explained in further detail in the following disclosure. In some embodiments, the processor(s) 110 may include a central processing unit (CPU), a graphics processing unit (GPU), both CPU and GPU, or other processing units or components known in the art. For instance, the processor(s) 110 may allow the user device 104 to access sites associated with games 116 and/or download applications that are used to access and/or play the games 116. Additionally, each of the processor(s) 110 may possess its own local memory, which also may store program modules, program data, and/or one or more operating systems.

In at least one configuration, the memory 112 of the user device 104 may include any component that may be used to access, play, and/or download the games 116. Depending on the exact configuration and type of the user device 104, the memory 112 may also include volatile memory (such as RAM), non-volatile memory (such as read-only memory (ROM), flash memory, miniature hard drive, memory card, or the like) or some combination thereof.

In various embodiments, the user device 104 may also have input device(s) such as a keyboard, a mouse, a pen, a voice input device, a touch input device, etc. The user device 104 may also include the display 114 and other output device(s), such as speakers, a printer, etc. The user 102 may utilize the foregoing features to interact with the user device 104 and/or the content server(s) 108 via the network(s) 106. More particularly, the display 114 of the user device 104 may include any type of display known in the art that is configured to present (e.g., display) information to the user 102. For instance, the display 114 may be a screen or user interface that allows the user 102 to access, play, and/or download the games 116. Further, one or more local program modules may be utilized to play the games 116 on a browser. The local program modules may be stored in the memory 112 and/or executed on the processor(s) 110 in order to present graphics associated with the games 116 on the display 114.

In some embodiments, the network(s) 106 may be any type of network known in the art, such as the Internet. Moreover, the user device 104 and the content server(s) 108 may communicatively couple to the network(s) 106 in any manner, such as by a wired or wireless connection. The network(s) 106 may also facilitate communication between the user device 104 and the content server(s) 108, and also may allow for the transfer of data or communications therebetween. For instance, the content server(s) 108 and/or other entities may provide access to the games 116 that may be accessed, played, and/or downloaded utilizing the user device 104.

In addition, and as mentioned previously, the content server(s) 108 may include one or more processor(s) 118 and a memory 120, which may include the game play module 122, the game management module 124, and the game enhancement module 126. The content server(s) 108 may also include additional components not listed above that perform any function associated with the content server(s) 108. In various embodiments, the content server(s) 108 may be any type of server, such as a network-accessible server, or the content server(s) 108 may be any entity that provides access to the games 116 that is stored on and/or is accessible by the content server(s) 108.

In various embodiments, the game play module 122 may enable a single user 102 or multiple users 102 to play one or more of the games 116. In particular, the game play module 122 may allow multiple users 102 to play one or more games 116 having a merge and match game mechanic with an automated grouping tool as described in further detail below.

In some embodiments, multiple different users 102 may independently play a single player game 116 in the virtual environment, where each of the users 102 is represented within the virtual environment by text, an image, an avatar, and/or other identifying information. During play of the game 116, each user 102 may play in collaboration with other users 102, may play with a team of users 102, or may compete against other users 102, either as an individual or as a team. The performance and/or progression of the users 102 may be monitored and displayed to the users 102, where the performance/progression associated with the game 116 may be represented by an amount of points, an amount of currency (e.g., awards, trophies, dollars, chips, prizes, etc.), reaching or passing levels associated with the game 116, etc.

Furthermore, the game management module 124 may facilitate the play of game moves 128 made by user 102 while those user 102 is playing the game 116. The game moves 128 may correspond to any action or operation taken by users 102 with respect to the game 116. For instance, the game moves 128 may include moving a game item from one game board tile to another, using an automated grouping tool to automatically group game board items into adjacent game board tiles, drawing a card, striking an opponent, spinning a set of reels, etc., for the purpose of achieving a particular goal associated with the game 116. User 102 may make the game moves 128 with respect to their own play of the game 116, or the game moves 128 may relate to other users 102 that are also playing the game 116, such as different users 102 that are playing the game 116 in collaboration with the user 102 and/or users 102 that are playing the game 116 in competition with the user 102. As a result, the game management module 124 may allow user 102 to have an influence on the play of other users 102 that are also playing the game 116.

The game enhancement module 126 may allow for one or more game features 130 (also referred to herein as "features"), such as, for example, automated grouping tools, to be enhanced, upgraded, and/or unlocked (e.g., by removing cooldown periods associated with the automated grouping tool, as described in further detail below). More particularly, the game features 130 may be enhanced, upgraded, and/or unlocked in response to one or more criteria or thresholds being satisfied. In certain embodiments, the criteria may correspond to events associated with the game 116 that may occur or that may be caused by actions of user 102. For instance, the predetermined criteria may correspond to one of user 102 achieving a certain score, gaining a particular amount of currency (e.g., points, dollars, trophies, chips, awards, etc.), receiving one or more particular cards, and/or hitting a particular set of reels in a virtual slot machine game 116 context. By monitoring the status, performance, progression, etc., of user 102, the game management module 124 may determine when one of the criteria/thresholds has been satisfied, meaning that the game management module 124 may determine when one of the events that is associated with the game 116 has occurred.

Figure 2:
FIG. 2 illustrates a game display according to an embodiment of the present disclosure that may be displayed by the gaming system shown in FIG. 1.

FIGS. 2-14 depict an example game display 200, which may be displayed, for example, by display 114 of user device 104 based on game data received from content server 108 to present game 116 to user 102. Referring to FIG. 2, game display 200 may include a plurality of game board tiles 202. One or more game items 204 may be displayed in respective game board tiles 202. Each game item 204 may be of a certain item type, with each type of game item being represented by a different image. For example, game display 200 includes game items of one type represented by an image of a stack of logs, and another type represented by an image of blue coin. During game play, users may move game items 204 from one game board tile 202 to another, for example, by dragging game item 204.

In the example embodiment, game display 200 includes a merge and match game mechanic, in which the user may find, move, and rearrange game items 204 such that game items 204 of the same type are displayed in adjacent game board tiles 202. If a threshold number of game items 204 (e.g., three game items 204) of the same type are displayed in adjacent game board tiles 202, the user may input a merge instruction that causes game items 204 to "merge," that is, be replaced by a single, higher-level or upgraded game item 204. For example, if three stack of logs game items 204 are positioned in adjacent game board tiles 202, the three stack of logs game items 204 may be replaced by a single game item 204 of a new type represented by a log house. Accordingly, to advance gameplay, the user may identify game items 204 of a matching group and move the identified game items 204 into adjacent game board tiles 202. However, if a large number of game items 204 of different types are present and/or if most game board tiles 202 are occupied, there may be a limited number of ways for users to make such combinations. For example, users may have difficulty finding game items 204 of the same type and/or there may not be enough room to move game items 204 of the same type to adjacent game board tiles 202.

In the example embodiment, game display 200 further includes a base magnet symbol 206 and a maximum magnet symbol 208, which are shown as images of a magnet and may be used to initiate an automatic grouping feature as described in further detail below. Base magnet symbol 206 and/or maximum magnet symbol 208 may be accessed by the user by selecting from a toolbox menu 210, which may be opened by selecting a toolbox icon 212 within game display 200. As described in further detail below, base magnet symbol 206 and/or maximum magnet symbol 208 may be activated by touching, clicking on, and/or dragging base magnet symbol 206 and/or maximum magnet symbol 208 from toolbox menu 210 to a location of a game item 204.

Figure 3:
FIG. 3 illustrates further detail of the game display shown in FIG. 2.
Figure 4:
FIG. 4 illustrates further detail of the game display shown in FIGS. 2 and 3.

Referring to FIGS. 3 and 4, in the example embodiment, when a base magnet symbol 206 is dragged and/or moved to a location of a game item 204 by the user to select the game item 204, base magnet symbol 206 may have the effect of causing some game items 204 to automatically group, that is, be moved to adjacent game board tiles 202. For example, when base magnet symbol 206 is dragged and/or moved to a location of a first game item 204, a predefined number of (e.g., four) game items of the same type (e.g., those closest to or within a threshold distance of the first game item 204) may automatically be moved to game board tiles 202 (e.g., to form a group of five, hence base magnet symbol 206 may sometimes be referred to as a "Magnet 5 symbol"). For example, as shown in FIG. 3, a blue coin game item 204 may be selected using base magnet symbol 206, which, as shown in FIG. 4, causes four other blue coin game items 204 to move to game board tiles 202 adjacent to the selected game item 204. Once positioned adjacently, the user may instruct a merging of the group of (e.g., blue coin) game items 204. Thus, using base magnet symbol 206, the user may quickly group game items 204 that can be merged to advance the game, and free up game board tiles 202, without needing to manually find and move game items 204 of the same type. In some embodiments, as shown in FIG. 4, if there are no empty game board tiles adjacent to the selected game item 204, game items 204 (e.g., the stack of logs game items 204 shown in FIGS. 3 and 4) in the adjacent game board tiles 202 may automatically be moved to make room for the incoming (e.g., blue coin) game items 204.

Figure 5:
FIG. 5 illustrates further detail of the game display shown in FIGS. 2-4.

In the example embodiment, after base magnet symbol 206 is used, subsequent use of base magnet symbol 206 may not be repeated until a cooldown period (e.g., five minutes) has expired. As shown in FIG. 5, a cooldown timer, shown beneath base magnet symbol 206 within toolbox menu 210, may indicate the time remaining before base magnet symbol 206 can be used again.

Referring again to FIG. 3, in some embodiments, when base magnet symbol 206 is pulled and/or hovered over a game item 204 (e.g., the blue coin), items ineligible to be automatically grouped with the blue coin, for example, game items 204 of different types (e.g., the stacks of logs) and/or game items 204 already adjacent to the selected game item 204, may be shown as transparent. For example, as shown in FIG. 3, the stacks of logs game items 204 are shown as transparent because the stacks of logs game items 204 are of a different type than the selected blue coin game item 204. In some embodiments, for each transparent game item 204 shown, data is stored in a cache of memory 120 that causes transparent game items 204 to be displayed. This data may remain stored in the cache even after the transparent game items 204 are now longer displayed (e.g., because the grouping operation has been completed), leading to an accumulation of data in the cache over time. This technical issue may be exacerbated when many automatic grouping operations are made in a short period of time (e.g., when an infinite magnet effect and/or infinite automated grouping tool is active, as described below). Accordingly, to solve this problem, the cache may be cleared periodically (e.g., after each grouping operation and/or a set number of grouping operations tracked by a counter).

Figure 6:
FIG. 6 illustrates further detail of the game display shown in FIGS. 2-5.
Figure 7:
FIG. 7 illustrates further detail of the game display shown in FIGS. 2-6.

Referring to FIGS. 6 and 7, in the example embodiment, when a maximum magnet symbol 208 is dragged and/or moved to a location of a game item 204 by the user to select the game item 204, maximum magnet symbol 208 may have the effect of causing all game items 204 having the same type as the selected game item 204 to automatically group and/or be moved to adjacent game board tiles 202. For example, as shown in FIG. 6, a stack of logs game item 204 may be selected using maximum magnet symbol 208, which, as shown in FIG. 7, causes all the other stack of logs game items 204 to move to game board tiles 202 adjacent to the selected game item 204. Thus, using maximum magnet symbol 208, the user may quickly group all currently-displayed game items 204 of the same type without needing to manually find and move game items 204. In some embodiments, as shown in FIG. 7, if there are no empty game board tiles adjacent to the selected game item 204, game items 204 (e.g., blue coin game items 204 shown in FIGS. 3 and 4) in the adjacent game board tiles 202 may automatically be moved to make room for the incoming (e.g., stack of logs) game items 204.

Figure 8:
FIG. 8 illustrates further detail of the game display shown in FIGS. 2-7.

In the example embodiment, after maximum magnet symbol 208 is used, use of maximum magnet symbol 208 may not be repeated until a cooldown period (e.g., six hours) has expired. As shown in FIG. 8, a cooldown timer, shown beneath maximum magnet symbol 208 within toolbox menu 210, may indicate the time remaining before maximum magnet symbol can be used again. In some embodiments, the cooldown timer associated with maximum magnet symbol 208 may be set with a longer cooldown time (e.g., six hours) than the cooldown timer associated with base magnet symbol 206 (e.g., five minutes).

Figure 9:
FIG. 9 illustrates further detail of the game display shown in FIGS. 2-8.

Referring to FIG. 9, game display 200 may further include one or more infinite magnet symbols 900. In the example embodiment, when the user selects (e.g., by tapping and/or clicking on) and activates an infinite magnet symbol 900, any base magnet symbols 206 and/or maximum magnet symbols 208 may be modified for a predefined time period (e.g., five minutes, thirty minutes, and/or one hour). During this time period, using a base magnet symbol 206 and/or maximum magnet symbol 208 does not result in the cooldown timer being set, enabling unlimited use of any available base magnet symbols 206 and/or maximum magnet symbols 208 during this time period. As shown in FIG. 9, the time period during which infinite magnet symbol 900 would be active if selected is indicated by the infinite magnet symbol 900 icon. For example, FIG. 9 depicts three infinite magnet symbol 900, having corresponding time periods of five minutes, thirty minutes, and one hour, respectively.

In some embodiments, users may obtain and/or unlock the ability to use infinite magnet symbols 900 by achieving certain objectives, such as by advancing through the game (e.g., making a certain number of merges unlocks infinite magnet symbols 900), playing a certain amount of time (e.g., time spent with the game application open or number of days spent playing in a row), and/or by purchasing infinite magnet symbols 900 using real or in-game currency. Obtained infinite magnet symbols 900 may be displayed on respective game board tiles 202, as shown in FIG. 9. Alternatively, in some embodiments, infinite magnet symbols 900 may be accessed and/or displayed in another portion of game display 200, such as toolbox menu 210.

Figure 10:
FIG. 10 illustrates further detail of the game display shown in FIGS. 2-9.

Referring to FIG. 10, once the user has selected infinite magnet symbol 900 (e.g., by tapping and/or clicking on the infinite magnet symbol 900), a confirmation prompt 1000 may be displayed, asking the user to confirm that the user would like to use infinite magnet symbol 900. In some embodiments, once used, infinite magnet symbol 900 may be "consumed," that is, removed from the display and/or unavailable for use until another infinite magnet symbol 900 is obtained. Thus, confirmation prompt 1000 may reduce a likelihood that the user unintentionally uses infinite magnet symbol 900.

Figure 11:
FIG. 11 illustrates further detail of the game display shown in FIGS. 2-10.

Referring to FIG. 11, when infinite magnet symbol 900 is activated, base magnet symbol 206 and/or maximum magnet symbol 208 may be modified to indicate that base magnet symbol 206 and/or maximum magnet symbol 208 may be used (e.g., repeatedly) without triggering a cooldown period. For example, as shown in FIG. 11, modified base magnet symbol 206 and/or maximum magnet symbol 208 shown in toolbox menu 210 may include an infinity icon and a timer indicating the remaining amount of time the effects of infinite magnet symbol 900 will be active.

Figure 12:
FIG. 12 illustrates further detail of the game display shown in FIGS. 2-11.

In some embodiments, only one infinite magnet symbol 900 may be activated at a given time. Accordingly, as shown in FIG. 12, a message 1200 indicating "Infinite Magnet is already active" may be displayed within game display 200 if the user attempts to select a second infinite magnet symbol 900 after a first infinite magnet symbol 900 has already been selected and remains currently active (e.g., the time period of the first infinite magnet symbol 900 has not yet expired). In some alternative embodiments, the user may select a second infinite magnet symbol 900 after a first infinite magnet symbol 900 has already been selected, and the time period associated with the second infinite magnet symbol 900 may be added to the remaining time associated with the first infinite magnet symbol 900. In some embodiments, the user may combine multiple infinite magnet symbols 900 prior to using the infinite magnet symbols 900, creating a single infinite magnet symbol 900 associated with a greater time period (e.g., the sum of the time periods associated with the combined infinite magnet symbols 900).

Figure 13:
FIG. 13 illustrates further detail of the game display shown in FIGS. 2-12.

FIG. 13 depicts an example help screen 1300 that may be displayed, for example, within game display 200. Help screen 1300 may include text and images illustrating to the user how to use and the effects of base magnet symbol 206.

Figure 14:
FIG. 14 illustrates further detail of the game display shown in FIGS. 2-13.

FIG. 14 depicts an example help screen 1400 that may be displayed, for example, within game display 200. Similar to help screen 1300, help screen 1400 may include text and images illustrating to the user how to use and the effects of maximum magnet symbol 208.

Figure 15A:
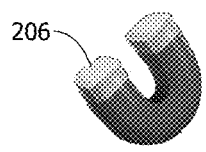
FIGS. 15A, 15B, and 15C illustrate example symbols that may be used in the game display shown in FIGS. 2-14.
Figure 15B:
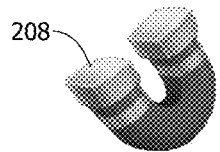
Figure 15C:
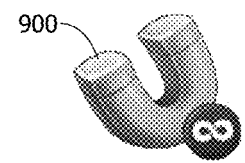

FIGS. 15A, 15B, and 15C depict example embodiments of base magnet symbol 206, maximum magnet symbol 208, and infinite magnet symbol 900, respectively. In alternative embodiments, different images may be used for symbols having the same effects as base magnet symbol 206, maximum magnet symbol 208, and infinite magnet symbol 900. For example, rather than magnets, any one of base magnet symbol 206, maximum magnet symbol 208, and/or infinite magnet symbol 900 may include a vacuum, hook, net, and/or any other image that may convey a sense of pulling or gathering objects (e.g., game items 204), or another image not necessarily related to pulling or gathering.

Figure 16:
FIG. 16 illustrates an example toolbox menu that may be used in the game display shown in FIGS. 2-14.

FIG. 16 depicts toolbox menu 210, as shown, for example, in FIG. 2, in which base magnet symbol 206 and maximum magnet symbol 208 are not modified, for example, by a cooldown timer and/or infinite magnet effect.

Figure 17:
FIG. 17 illustrates another example toolbox menu that may be used in the game display shown in FIGS. 2-14.

FIG. 17 depicts toolbox menu 210, as shown, for example, in FIG. 8, in which base magnet symbol 206 and maximum magnet symbol 208 are modified with a cooldown timer, as described above. As shown in FIG. 17, base magnet symbol 206 may not be used again for one minute twenty-nine seconds, and maximum magnet symbol 208 may not be used again for fifty-nine minutes fifty-five seconds.

Figure 18:
FIG. 18 illustrates another example toolbox menu that may be used in the game display shown in FIGS. 2-14.

FIG. 18 depicts toolbox menu 210, as shown, for example, in FIG. 11, in which base magnet symbol 206 and maximum magnet symbol 208 are modified with the effect of using infinite magnet symbol 900, as described above. As shown in FIG. 8, the effects of using infinite magnet symbol 900, in which using base magnet symbol 206 and/or maximum magnet symbol 208 will not result in a cooldown period, will remain active for a remaining four minutes forty-seven seconds.

Figure 19:
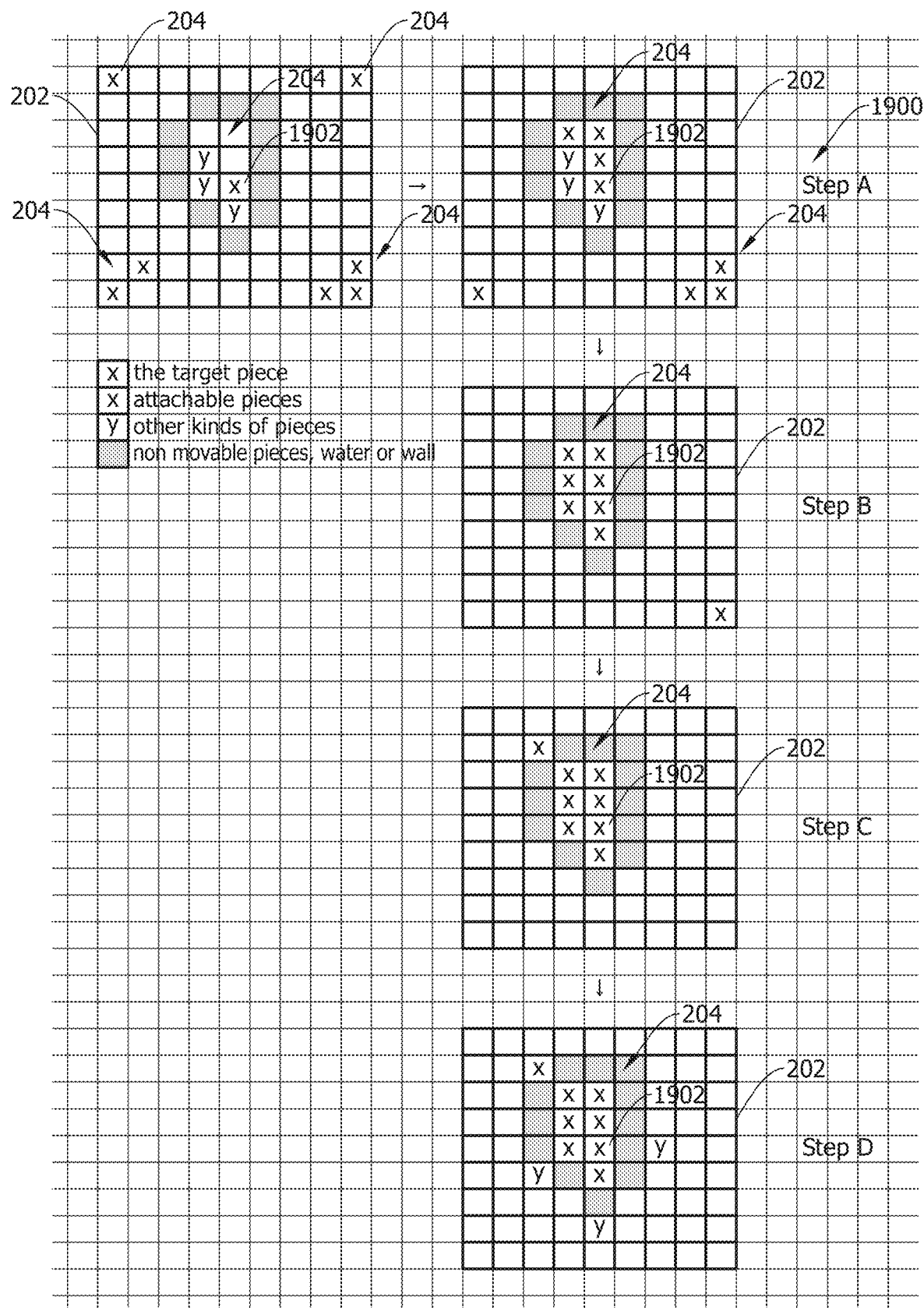
FIG. 19 depicts a flow diagram illustrating an example algorithm for controlling a game display such as the game display illustrated in FIGS. 2-14.

FIG. 19 depicts a flow diagram 1900 illustrating an example algorithm for controlling a game display such as the game display 200 (illustrated in FIGS. 2-14) in response to using an automated grouping tool such as base magnet symbol 206. A state of game display 200 (e.g., locations of game items 204 within game board tiles 202) may be stored in memory 120 of content server 108. Game board tiles 202 may include non-shaded game board tiles 202 in which a respective game item 204 may be displayed, and shaded game board tiles 202 in which game item 204 cannot be displayed. The shaded game board tiles 202 may correspond to, for example, water, walls, or cliffs as shown in game display 200. In FIG. 19, game items 204 of a first type are represented by an "x," and game items 204 of a second type are represented by a "y."

In the example embodiment, a target game item 1902 may be selected from among game items 204 by, for example, dragging base magnet symbol 206 to the location of target game item 1902. In some embodiments, before target game item 1902 is selected (e.g., while base magnet symbol is hovered over target game item 1902), attractable game items 204 (e.g., those of the same type "x" as target game item 1902 and are not already adjacent to target game item 1902) may be highlighted. Non-attractable game items 204 (e.g., those of different types, such as "y," or those already adjacent to target game item 1902) may be faded out.

In the example embodiment, when target game item 1902 is selected, content server 108 may identify attractable pieces game items 204 of the same type (e.g., the "x" type) as the target game item 1902. When a symbol, such as base magnet symbol 206, causing a limited number of game items 204 to be grouped is used, content server 108 may identify the game items 204 of the same time being closest to target game item 1902 (e.g., the four closest). Content server 108 may further identify game board tiles 202 (sometimes referred to herein as "target" game board tiles 202) adjacent and/or closest to target game item 1902, to which the identified game items 204 of the same type may be moved. Specifically, content server 108 may identify empty adjacent game board tiles 202 closest to the target game item 1902. If enough empty game board tiles 202 are not found, content server 108 may identify any adjacent game board tiles 202 (e.g., even those already including a game item 204 such a "y" type game item 204) closest to the target game item 1902.

If other game items 204 are already present in the identified closest game board tiles 202, the other (e.g., "y" type) game items 204 may be moved to another position, such as a closest possible game board tile 202 and/or an empty game board tile 202 that is the fewest steps (e.g., number of game board tiles 202 across) away. Content server 108 may move the attractable (e.g., "x" type) game items 204 to the identified spaces adjacent and/or close to target game item 1902. In one or more embodiments, the other (e.g., "y" type) game items 204 may be moved to positions that are farthest away from the target game item 1902, move a predefined number of game board tiles 202 away from target game item 1902, and/or group together when the other game items 204 are the same game item type. In another example, the other (e.g., "y" type) game items 204 may be moved to an area that has the same number of game board tiles 202 open or available as the number of other (e.g., "y" type) game items 204 that the magnet functionality would need to relocate to accommodate the incoming ("x" type) game items 204. In embodiments including game board tiles 202 in which game items cannot be displayed (e.g., the shaded game board tiles 202), if such game board tiles 202 are adjacent to the target game item 1902, the incoming game items 204 may be placed in a next closest available game board tile 202, or, in other words, moved the smallest possible distance (e.g., across the fewest number of game board tiles 202) to an open and/or non-shaded game board tile 202.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming system comprising a memory and one or more processors in communication with the memory, wherein the one or more processors are configured to:
   store, in the memory, an initial location of a plurality of game items within a plurality of game board tiles, each of the game items having an item type of a plurality of item types and being located in one of the game board tiles;
   transmit game data to a user device causing the user device to display a user interface including the plurality of game board tiles and the plurality of game items;
   receive, from the user device, a selection of a target game item of the plurality of game items using an automated grouping tool;
   identify a group of game items having a same item type as the target game item;
   identify a plurality of target game tiles located adjacent to the target game item;
   record, in the memory, an updated location for each of the identified group of game items, the updated locations corresponding to the identified plurality of target game tiles; and
   transmit further game data to the user device causing the user device to display the user interface to include the identified group of game items located in the updated locations.

2. The gaming system of claim 1, wherein the one or more processors are further configured to, in response to recording the updated location for each of the identified group of game items, clear, in the memory, the initial locations of the plurality of game items.

3. The gaming system of claim 1, wherein the one or more processors are further configured to periodically clear, in the memory, the initial locations of the plurality of game items.

4. The gaming system of claim 1, wherein the one or more processors are further configured to, in response to recording the updated location for each of the identified group of game items, disable subsequent use of the automated grouping tool for a predefined cooldown period.

5. The gaming system of claim 4, wherein the one or more processors are further configured to:
   receive a selection of an infinite automated grouping tool; and
   in response to receiving the selection of the infinite automated grouping tool, enable subsequent use of the automated grouping tool for a predefined time period without triggering the predefined cooldown period.

6. The gaming system of claim 1, wherein the group of game items includes a predefined number of game items of the same item type as the target game item.

7. The gaming system of claim 6, wherein the group of game items includes the predefined number of game items closest to the target game item within the user interface.

8. The gaming system of claim 1, wherein the group of game items includes each game item of the same item type as the target game item.

9. The gaming system of claim 1, wherein the one or more processors are further configured to:
   receive, from the user device, a merge instruction associated with the target game item;
   update the memory to replace the target game item with an upgraded game item and remove the group of game items displayed adjacent to the target game item; and
   transmit further game data to the user device causing the user device to display the user interface including the upgraded game item.

10. A method for automated grouping in an electronic game performed by a gaming system including a memory and one or more processors in communication with the memory, the method comprising:
    storing, in the memory, an initial location of a plurality of game items within a plurality of game board tiles, each of the game items having an item type of a plurality of item types and being located in one of the game board tiles;
    causing a user device to display a user interface including the plurality of game board tiles and the plurality of game items;
    receiving, from the user device, a selection of a target game item of the plurality of game items using an automated grouping tool;
    identifying a group of game items having a same item type as the target game item;
    identifying a plurality of target game tiles located adjacent to the target game item;
    recording, in the memory, an updated location for each of the identified group of game items, the updated locations corresponding to the identified plurality of target game tiles; and
    causing the user device to update the user interface to include the identified group of game items located in the updated locations.

11. The method of claim 10, further comprising, in response to recording the updated location for each of the identified group of game items, clearing, in the memory, the initial locations of the plurality of game items.

12. The method of claim 10, further comprising periodically clearing, in the memory, the initial locations of the plurality of game items.

13. The method of claim 10, further comprising, in response to recording the updated location for each of the identified group of game items, disabling subsequent use of the automated grouping tool for a predefined cooldown period.

14. The method of claim 13, further comprising:
    receiving a selection of an infinite automated grouping tool; and
    in response to receiving the selection of the infinite automated grouping tool, enabling subsequent use of the automated grouping tool for a predefined time period without triggering the predefined cooldown period.

15. The method of claim 10, wherein the group of game items includes a predefined number of game items of the same item type as the target game item.

16. The method of claim 15, wherein the group of game items includes the predefined number of game items closest to the target game item within the user interface.

17. The method of claim 10, wherein the group of game items includes each game item of the same item type as the target game item.

18. The method of claim 10, further comprising:
receiving, from the user device, a merge instruction associated with the target game item;
updating the memory to replace the target game item with an upgraded game item and remove the group of game items displayed adjacent to the target game item; and
causing the user device to update the user interface to include the upgraded game item.

19. A non-transitory computer-readable storage media having computer-executable instructions embodied thereon, wherein when executed by a gaming system including at least one memory and one or more processors in communication with the memory, the computer-executable instructions cause the one or more processors to:
store, in the at least one memory, an initial location of a plurality of game items within a plurality of game board tiles, each of the game items having an item type of a plurality of item types and being located in one of the game board tiles;
transmit game data to a user device causing the user device to display the plurality of game board tiles and the plurality of game items;
receive, from the user device, a selection of a target game item of the plurality of game items using an automated grouping tool;
identify a group of game items having a same item type as the target game item;
identify a plurality of target game tiles located adjacent to the target game item;
record, in the at least one memory, an updated location for each of the identified group of game items, the updated locations corresponding to the identified plurality of target game tiles; and
transmit further game data to the user device causing the user device to display the identified group of game items located in the updated locations.

20. The non-transitory computer-readable storage media of claim 19, wherein the computer-executable instructions further cause the one or more processors to, in response to recording the updated location for each of the identified group of game items, clear, in the at least one memory, the initial locations of the plurality of game items.

* * * * *